United States Patent [19]
Chew et al.

[11] Patent Number: 5,912,643
[45] Date of Patent: Jun. 15, 1999

[54] PASSIVE NAVIGATION SYSTEM

[75] Inventors: Sung-Leung Chew, Jamaica; Joseph N. Dmytrasz, Glen Head; Joseph Gatta, Port Washington; Henry F Ritchie, Bayside, all of N.Y.; Donald L. Sumner, Keller, Tex.

[73] Assignee: Lockheed Corporation, Bethesda, Md.

[21] Appl. No.: 08/865,541

[22] Filed: May 29, 1997

[51] Int. Cl.[6] ..................................................... G01S 3/02
[52] U.S. Cl. ............................................................ 342/457
[58] Field of Search .................................. 342/357, 457; 701/214, 216, 221, 224

[56] References Cited

U.S. PATENT DOCUMENTS 5,339,684  8/1994  Jircitano et al. .
5,402,340  3/1995  White et al. .

*Primary Examiner*—Theodore M. Blum
*Attorney, Agent, or Firm*—Seymour Levine

[57] ABSTRACT

A Passive Navigation System (PNS) provides continuous updating of position, velocity, and attitude information of a vehicle without recourse to radiating or external navigation aids. The system accurately computes navigation information with the utilization of gravity sensors, gravimetric maps, vertical position, and velocity measurements. Sensor and map data are optimally processed by real time filtering to compute the best position, velocity, and attitude of the vehicle. The products of measured gravity gradients and the velocity of the vehicle are integrated over time to obtain a north, east, down gravity vector components which are combined with corresponding components obtained from a vertical deflection map in a complementary filter. North and east components of the combination are compared with the corresponding components from the vertical deflection map, while the down component of the gravity is compared to the down value obtained from a gravimeter. Residuals from these comparisons are utilized in a Kalman filter to provide corrections that render inertial measuring units in the system independent of the vertical deflections and gravity anomalies. Measured gravity gradients are compared to reference map gradients, the residuals being utilized in the kalman filter to estimate long term position errors and to provide correction for gradiometer bias and drift. A vertical position loop mixes gravity down data obtained from a gravimeter and gravity down data obtained from the integrator to provide vertical position which is compared to a reference derived from the difference between a measured vehicle height and terrain height obtained from a geoidal map. The residual of this comparison is utilized in the Kalman filter to improve estimates of east velocity.

10 Claims, 1 Drawing Sheet

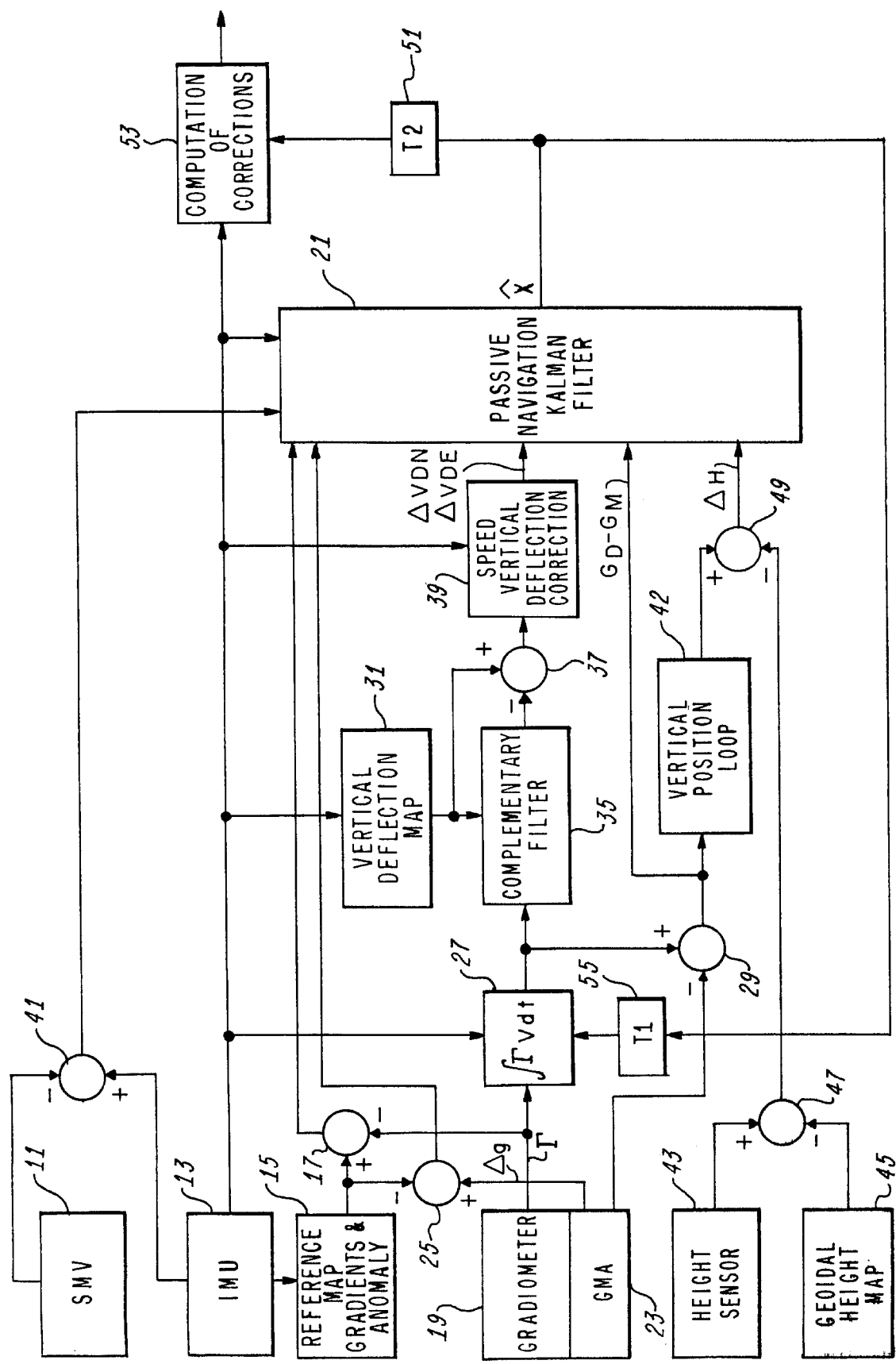

PASSIVE NAVIGATION SYSTEM

BACKGROUND OF THE INVENTION

1. Field of the Invention

This invention pertains to the field of navigation and more specifically to a navigation system employing only inertial components.

2. Description of the Prior Art

Prior art passive navigation systems utilizing only gyroscopes and accelerometers do not provide the continuous velocity, position, and attitude accuracy generally required for the long term operation of such systems. Position, velocity, and attitude errors caused by drift and gravitational effects on these inertial sensors, rendered them unacceptable as a sole sensors in a navigation system for operation over the long term. Operation over the long term of these prior art inertial navigation systems required periodic updates of position. These updates were generally provided by fixes from the Global Positioning System (GPS), a radar navigation system, or a sonar system.

Significant improvements have been made in inertial instruments such as gyroscopes and accelerometers. Drift has been reduced to insignificant levels leaving only the gravitational effects as the major source of error. Though gravimetric maps are available for the correction of inertial sensor performance, highly accurate corrections can be made with the use of these maps only if the position of the vehicle is precisely known and the maps are error free. Additionally, the vertical gravitational field which is deflected by the coriolis effect is further deflected by the motion of the vehicle. Vertical deflection, create horizontal components, which are known as horizontal gravity anomalies. These anomalies impact on inertial navigation systems very much like accelerometer errors. As the vehicle traverses through the anomalous gravity field, the Schuler loop is excited and velocity and position errors are generated which increase with time. Consequently, if a completely inertial navigation system is to provide sufficient accuracy over the long term, inertial sensor errors, caused by anomalous gravitational fields, must be corrected in real time.

Processing gravity anomalies in a Kalman filter requires complicated modeling. Consequently, inertial navigation systems of the prior art operate in conjunction with electromagnetic systems or external navigation systems, such as the Global Positioning System (GPS) to receive periodic updates from these systems. An inertial navigation system of the prior art, disclosed in U.S. Pat. No. 5,272,639 issued to J. T. McGuffin on Dec. 23, 1993, periodically utilizes three sets of geo-physical correlation data to provide updates to a primary inertial navigator. A Kalman filter is used to correlate terrain data, electromagnetic data, and gravimetric data with the output of a digital map of terrain, electromagnetic field, and gravity. A best of three selection process, based on the errors in the Kalman filter, decides whether to accept the prediction of the terrain system, electromagnetic system, or the gravity system to update the inertial navigator.

SUMMARY OF THE INVENTION

In accordance with the present invention, a Passive Navigation System (PNS) provides continuous updating of position, velocity, and attitude information of a vehicle without recourse to communication with the GPS, a radiating radar system, or a radiating sonar system. The system accurately computes navigation information with the utilization of gravity sensors, gravimetric maps, vertical position, and electromechanical velocity determining devices integrated with inertial measurements. Information derived from the sensors and maps is optimally processed by real time filtering to compute the best position, velocity, and attitude of the vehicle. The product of measured gravity gradients and the velocity of the vehicle are integrated over time to obtain a north, east, down gravity vector. The north, east, and down vector components are filtered in a complementary filter to combine the best of the higher frequency data from the gradiometer with low frequency vertical deflection obtained from gravity maps to form improved vertical deflection and gravity anomaly estimates.

The improved vertical deflection and gravity anomaly estimates are compared to corresponding map values. Residuals from these comparisons are utilized in a Kalman filter to provide corrections that render inertial measuring units that are independent of the effect of vertical deflection and gravity anomaly. Gravity gradients provided by the gradiometer are respectively compared to corresponding gravity gradients provided by a reference gravity gradient map. The residuals of these comparisons are utilized in the Kalman filter to estimate long term position errors and to provide correction data for gradiometer bias and drift.

Gravity down data obtained by integrating the gradient data is compared to gravity down data obtained from a gravimeter, the residual of the comparison is coupled to a vertical position loop which provides vertical position based on the residual data. This gravity derived vertical position is compared to the vertical position obtained from a comparison of the vehicle's vertical position sensor and terrain height obtained from a geoidal map. The residual of this comparison is coupled to the Kalman filter wherein it is utilized to provide an improved east velocity estimate.

BRIEF DESCRIPTION OF THE DRAWINGS

The sole figure is a block diagram of a preferred embodiment of the invention.

DESCRIPTION OF THE PREFERRED EMBODIMENTS

A preferred embodiment of a passive navigation system in accordance with the present invention is shown in the figure. In this embodiment the velocity of a vehicle and its position are continuously measured and calculated, respectively, by two sensor systems, a surrounding-medium-velocity determining system (SMV) 11, and an inertial-measuring-unit (IMU) 13, comprised of gyroscopes and accelerometers. The errors inherent in these sensors are corrected by the passive navigation system, as will be explained, without recourse to communications with the Global Positioning System (GPS) or to any position reference system requiring radiation from the vehicle.

Signals representative of the vehicle position provided by the IMU sensors are utilized to extract gravity gradients and anomalies, at the position indicated, from a reference map 15 stored within the system. Gradient representative signals, at IMU indicated position, are coupled from the reference map 15 to a differencing network 17 to which signals representative of measured gravity gradients, at the actual position, provided by a gradiometer 19 are also coupled.

Gravity gradient components at a point in space may be arranged in a gravity gradient matrix as follows:

$$\begin{vmatrix} \Gamma_{xx} & \Gamma_{xy} & \Gamma_{xz} \\ \Gamma_{yx} & \Gamma_{yy} & \Gamma_{yz} \\ \Gamma_{zx} & \Gamma_{zy} & \Gamma_{zz} \end{vmatrix} \quad \Gamma_{ij} = \frac{\partial g_i}{\partial j}$$

In this matrix the diagonal elements $\Gamma_{ii}$ represent the rate of change of a gravity component at some point in space with the translation of that point in the direction of that gravity component vector, while the off diagonal elements $\Gamma_{ij}$ represent the rate of change of a gravity component at a given point in space with the translation of that point in a direction transverse to the direction of that gravity component vector. With the definitions given above it should be apparent that the matrix is, in general not symmetrical. The asymmetry, however, is slight. Consequently, a symmetrical matrix can be assumed and data with sufficient accuracy for the purposes of this invention may be obtained with only three of the six off diagonal components and the three diagonal components.

Gravity gradients from the reference map 15 are subtracted from gravity gradients measured by the gradiometer 19 in the differencing network 17 to obtain the following set of data for entry into the Kalman filter 21:

$$Y_1 = \Gamma_{xx}(X, Y) - \Gamma_{mapxx}(\overline{X}, \overline{Y})$$
$$Y_2 = \Gamma_{xy}(X, Y) - \Gamma_{mapxy}(\overline{X}, \overline{Y})$$
$$Y_3 = \Gamma_{yy}(X, Y) - \Gamma_{mapyy}(\overline{X}, \overline{Y})$$
$$Y_4 = \Gamma_{yz}(X, Y) - \Gamma_{mapyz}(\overline{X}, \overline{Y})$$
$$Y_5 = \Gamma_{zz}(X, Y) - \Gamma_{mapzz}(\overline{X}, \overline{Y})$$
$$Y_6 = \Gamma_{zx}(X, Y) - \Gamma_{mapzx}(\overline{X}, \overline{Y})$$

where $\overline{X}, \overline{Y}$ is the latitude, longitude indicated by the inertial measuring unit 13 and (X,Y) is the assumed true position. The values $Y_1$ through $Y_6$ allow the Kalman filter to provide accurate estimates of the long term IMU position errors and to correct the gradiometer bias and drift.

Long term IMU position errors and east velocity error may also be modeled with the utilization of gravity anomaly information. Measured gravity anomaly is obtained from the difference between the magnitudes of a gravity measuring accelerometer located in the GMA 23, which measures the total gravitational field, and a gravimeter also located in the GMA 23, which measures the down component of the gravitational field. Both the gravity measuring accelerometer and the gravimeter measurements are influenced by the Coriolis effect on a moving object. The difference between these measurements, however, is devoid of Coriolis influence and is a measure of the gravity anomaly $\Delta g_{GMA}$ at the measurement position. This difference is then subtracted from the gravity anomaly obtained from the reference map 15 in a differencing network 25 to obtain $Y_7$, the seventh element of the input vector to the Kalman filter 21:

$$Y_7 = \Delta g_{GMA}(X,Y) - \Delta g_{MAP}(\overline{X},\overline{Y})$$

where (X,Y) is the position at which the measurements were made and $(\overline{X}, \overline{Y})$ is the IMU's indicated position. The value of the vector element $Y_7$ allows the Kalman filter to further improve IMU position error estimation over that obtained by using Gradient Map Matching measurements represented by input vector elements $Y_1$–$Y_6$. Gravity Anomaly Map Matching uses the longer wave length data in the gravity data compared to the shorter wave length data used in the Gradient Map Matching. Consequently, increased accuracy is realized by the Kalman filter with the addition of input vector element $Y_7$, obtained by Gravity Anomaly Map Matching, over that obtained with the sole utilization of input vector elements $Y_1$–$Y_6$, obtained by Gravity Gradient Map Matching. Improved estimation of IMU long term position errors result.

Accuracy of the horizontal velocity determination is dependent on the accuracy of accelerometer measurements. Accelerometer errors may be induced by vertical deflections of the gravity vector. These errors are functions of the latitudinal and vertical positions. Thus, a measure of the vertical deflection effect on the accelerometer measurement may be obtained by integrating, over a specified periods of time, the product of the gravity gradient components along the paths of the vehicle motion and the vehicle velocity. Such an integration is performed in an integrator 27 which receives velocity representative signals from the IMU 13 and gravity gradient representative signals from the gradiometer 19. The result of this integration $G=[\int \Gamma V dt]$ is the gravity vector at the position of the vehicle.

$\Gamma$ can be approximated by a constant matrix over a small time interval, so that the gravity value in the region covered by the time interval is $$G = \Gamma \int_{t_1}^{t_2} V dt.$$

The integration results in a distance vector S, so that $G=\Gamma S$. This integration followed by the proper matrix multiplication provides the following vector for G:

$$\begin{vmatrix} \Gamma_{xx}S_x + \Gamma_{xy}S_y + \Gamma_{xz}S_z \\ \Gamma_{yx}S_x + \Gamma_{yy}S_y + \Gamma_{yz}S_z \\ \Gamma_{zx}S_x + \Gamma_{zy}S_y + \Gamma_{zz}S_z \end{vmatrix}$$

When the reference axes are aligned such that x is the north coordinate N, y is the east coordinate E, and z is the down coordinate D; the components of this vector are $$G_N = \Gamma_{xx}S_x + \Gamma_{xy}S_y + \Gamma_{xz}S_z$$
$$G_E = \Gamma_{yx}S_x + \Gamma_{yy}S_y + \Gamma_{yz}S_z$$
$$G_D = \Gamma_{zx}S_x + \Gamma_{zy}S_y + \Gamma_{zz}S_z$$

Gradiometers provide gravity gradients by taking the difference between gravity values determined at two positions. Due to the closeness of these measurement positions, Coriolis effects on the gravity measurements are the same. Therefore, the gradient measurement is independent of Coriolis. Gravimeters, however, provide values for the down component of gravity which include the Coriolis. Consequently, the difference between the down component $G_D$ of the gravity vector and the gravity down component provided by a gravimeter is the gravitational error caused by the Coriolis effect.

To determine the Coriolis effect, the down gravitational vector component $G_D$ is coupled to differencing network 29 to which the vertical gravity component $G_M$, measured by a gravimeter, a gravity measuring accelerometer (GMA) 23, is also coupled. The signal representative of the difference $G_D$–$G_M$ at the output terminal of the differencing network 29 is coupled to the Kalman filter 21 as the eighth element $Y_8$ of the filter input vector. This element is used in the Kalman filter 21 to determine the east velocity error from the Coriolis induced error. It can be shown that the east velocity error is related to the input vector element $Y_8=G_D-G_M$, the Coriolis induced error, in the following manner:

$$Y_8 = G_D - G_M = 2\Omega \cos L \frac{\delta V_e}{R} + \text{Instrument errors}$$

where:
$\Omega$ is the Earth's rotation rate
L is the latitudinal position of the vehicle
$\delta V_e$ is the easterly velocity error
R is the radius of the Earth
$G_D$, in general, contains the earth gravity values and vertical acceleration information. The differencing network 29 output signal, $G_D-G_M$, is therefore representative of the vertical acceleration. This signal is also coupled to a vertical position loop 42 wherein a double integration is performed to obtain a vertical position estimate $H_V$. Vertical position is also estimated by coupling a signal representative of the vehicle height $H_S$, provided by a height sensor 43, and a signal representative of the geoidal height $H_M$ as given by a geoidal height map 45 to a differencing network 47, which provides an output signal representative of $H_S-H_M$. The signals representative of $H_V$ and $H_S-H_M$ are coupled to another differencing network 49 wherefrom a signal $\Delta H$ is coupled to the Kalman filter 21 as input vector component $Y_9$. The estimation of the east velocity error utilizing the component $Y_9$ is similar to the estimation of the east velocity error utilizing the component $Y_8$. The noise characteristics present in the two observations, however, are different. Use of both components improves IMU east velocity error estimation accuracy.

In addition, the $G_N$ and $G_E$ components of the gravity vector $G=\Gamma S$ contain high frequency vertical deflection (VD; VDN $G_E$; VDW $G_N$) information. Improved VD values can be obtained by combining $G_N$ and $G_E$ in a complementary filter 35 with corresponding gravitation vector components coupled to the filter 35 from the vertical deflection map 31. The result of the filtering is to combine the best of the higher frequency vertical deflection data obtained from the gradiometer measurements via high pass filtering and the low frequency vertical deflection data from the vertical deflection map 31 obtained via low pass filtering. Filtering in this manner results in an improved vertical deflection estimate. This improved vertical deflection estimate is coupled to the differencing network 37 wherein it is compared with the vertical deflection values provided by the vertical map 31 values to obtain, after conversion for speed dependency in a vertical deflection speed correction unit 39, vertical defection residuals, $\Delta VDN$ and $\Delta VDE$. These residuals are fed back to the Kalman filter 21, as component $Y_{10}$ of the input vector, to estimate the VD induced velocity errors via the navigation dynamics.

Two sets of measurements, velocity north and east given by the IMU 11, which provide the vehicle velocity, and the velocity north and east given by the SMV 13, which provides the velocity of the surrounding medium, are used in the Kalman filter to enhance the estimation of IMU north and east velocity errors. The north, $V_N^{IMU}$, and east, $V_E^{IMU}$, velocities determined by the IMU 13 and the north, $V_N^{SMV}$, and east, $V_E^{SMV}$ determined by the SMV 11 are coupled to a differencing network 41. The output of the differencing network 41 provides two elements to the Kalman filter 21 vector input, $Y_{11}=V_N^{IMU}-V_N^{SMV}$ and $Y_{12}=V_E^{IMU}-V_E^{SMV}$. The vector elements $Y_{11}$ and $Y_{12}$ are entered into the measurement matrix of Kalman filter, wherein they are utilized to obtain the enhanced estimate of the north and east velocity errors.

The Kalman filter 21 utilizes the twelve components of the input vector to generate an output state vector $\hat{x}$ which contains signals representative of estimates of position (north, east, down) and velocity errors, dominant long-term IMU errors, wind or ocean current induced errors, gradient measurement errors, map errors, and vertical position detector errors. These values are appropriately transformed in value transformer 51 and coupled to correction computer 53 wherefrom the corrections are respectively distributed to update the vehicles indicated position, velocity, and attitude. Gravitational corrections provided by the Kalman filter are appropriately transformed in transformer 55 and coupled to the integrator 27 to provide gravitational updates. The updated position values are optimal and are generated without the aid of communication with external navigation aids.

While the invention has been described in its preferred embodiments, it is to understood that the words that have been used are words of description rather than limitation and that changes may be made within the purview of the appended claims without departing from the true scope and spirit of the invention in its broader aspects.

We claim:

1. An apparatus for navigating a vehicle, of the type having gravity measuring means for determining gravitational fields, gradiometer means for determining gravity gradients, gravity reference map means for providing reference gravity data, means for providing vehicle position and velocity, and a Kalman filter which utilizes the data supplied to provide a state vector, the components of which are used to update the various sensors of the navigation apparatus comprising:

an integrator coupled to receive signals representative of vehicle velocity from said position and velocity means and signals representative of gravity gradient from said gradiometer means for providing signals representative of an integration over a selected time interval of a product of said gravity gradient and said vehicle velocity, thereby providing output signals representative of a gravity vector having a gravity north component, a gravity east component, and a gravity down component;

a complementary filter coupled to receive signals representative of gravity north and gravity east components from said reference map means and said gravity north and gravity east component representative signals from said integrator to provide signals representative of gravity vertical deflection;

first differencing means coupled to receive said signals representative of gravity vertical deflection from said complementary filter and signals representative of gravity vertical deflection from said gravity reference map means for coupling signals representative of differences between gravity vertical deflection provided by said gravity reference map means and gravity vertical deflection provided by said complementary filter to said Kalman filter, wherein a state vector is determined and an output terminal; and means coupled to receive said state vector for updating position, velocity, and attitude of said vehicle.

2. The navigation apparatus of claim 1 further comprising vertical deflection speed corrector means coupled between said first differencing means said Kalman filter said speed corrector means further coupled to receive signals representative of vehicle speed from said position and velocity means for providing speed corrections to said vertical deflection difference representative signals.

3. The navigation apparatus of claim 2 further comprising second differencing-means coupled to said gravity means for receiving signals representative of measured gravity down components and to said integrator for receiving said gravity down representative signals for providing signals representative of differences between said gravity down components and said measured gravity down components, said differences between said gravity down components and said measured gravity down components coupled to said Kalman filter for providing east velocity correction components in said state vector.

4. The navigation apparatus of claim 3 further comprising:

vertical position means coupled to receive said signal representative of said difference between said down component and said measured down component for providing a signal representative of vertical position of said vehicle;

sensor means for providing signals representative of vehicle vertical position;

geoidal height map means for providing signals representative of terrain height;

third differencing means coupled to receive said vehicle vertical position representative signals and said terrain height representative signals for providing vertical difference signals representative of differences between said vehicle vertical position and said terrain height;

fourth differencing means coupled to receive said vertical position representative signals and said vertical difference representative signals for providing difference signals representative of differences between said vertical position representative signals and said vertical difference representative signals at an output terminal coupled to said Kalman filter for providing a second east velocity correction component in said state vector.

5. The navigation apparatus of claim 4 wherein said gradiometer means provides a measured gravity gradient matrix and said gravity reference means provides a reference gravity gradient matrix and further comprising second differencing means coupled to said gradiometer means and said gravity map means for providing signals respectively representative of differences between corresponding components of said measured gravity matrix and said reference gravity gradient matrix, said second difference means having output terminals coupled to said Kalman filter for providing signals representative of long term position errors and signals for correcting gradiometer bias and drift.

6. The navigation apparatus of claim 1 wherein said gradiometer means provides a measured gravity gradient matrix and said gravity reference map means provides a reference gravity gradient matrix and further comprising second differencing means coupled to said gradiometer means and said gravity reference map means for providing signals respectively representative of differences between corresponding components of said measured gravity matrix and said reference gravity gradient matrix at output terminals coupled to said Kalman filter for providing signals representative of long term position errors and signals for correcting gradiometer bias and drift.

7. The navigation apparatus of claim 1 wherein said reference map means provides signals representative of reference gravity anomalies and said gravity measuring means provides signals representative of measured gravity anomalies and further comprising second differencing means coupled to said reference map means and said gravity measuring means for providing a signal representative of a difference between said measured gravity anomalies and said reference gravity anomalies, said second difference means having an output port coupled to said Kalman filter for providing signals representative of vehicle position errors.

8. The navigation apparatus of claim 1 further comprising second differencing means coupled to said gravity means for receiving signals representative of measured gravity down components and to said integrator for receiving said gravity down component representative signals to provide signals representative of differences between said gravity down component representative signals and said measured down component representative signals, said differences between said gravity down component representative signals and said measured gravity down component representative signals coupled to said Kalman filter for providing east velocity correction components in said state vector.

9. An apparatus for navigating a vehicle, of the type having gravity measuring means for determining gravitational fields, gradiometer means for determining gravity gradients, gravity reference map means for providing gravity data, means for providing vehicle position and velocity, and a Kalman filter which utilizes the data supplied to provide a state vector, the components of which are used to update the various sensors of the navigation apparatus comprising:

an integrator coupled to receive signals representative of vehicle velocity from said position and velocity means and signals representative of gravity gradient from said gradiometer means for providing a signal representative of an integration over a selected time interval of a product of said gravity gradient and said vehicle velocity, thereby providing output signals representative of a gravity vector having a gravity north component, a gravity east component, and a gravity down component;

first differencing means coupled to said gravity measuring means for receiving a signal representative of a measured down component of gravity and to said integrator for receiving said output signal representative of said down component of gravity to provide a signal representative of a difference between said down component of gravity and said measured down component of gravity;

vertical position means coupled to receive said signal representative of said difference between said down and said measured down components of gravity for providing a vertical position correction signal;

sensor means for providing a signal representative of vehicle vertical position;

geoidal height map means for providing a signal representative of terrain height;

second differencing means coupled to receive said vehicle vertical position representative signal and said terrain height representative signal for providing a vertical position difference signal representative of a difference of said vehicle vertical position and said terrain height;

third differencing means coupled to receive said vertical position correction signal and said vertical difference representative signal for providing a difference signal representative of a difference between said vertical position correction signal and said vertical difference representative signal to said Kalman filter from which an east velocity correction component in said state vector is determined.

10. An apparatus for navigating a vehicle, the apparatus being of the type having gravity measuring means for determining gravitational fields, gradiometer means for determining gravity gradients, gravity reference map means for providing gravity data, means for providing vehicle position and velocity, and a Kalman filter which utilizes the data supplied to provide a state vector, the components of which are used to update the various sensors of the navigation apparatus characterized in that:

said gradiometer means provides a measured gravity gradient matrix and said gravity reference means provides a reference gravity gradient matrix; and in that said apparatus further comprises first differencing means coupled to said gradiometer means and said gravity reference map means for providing signals respectively representative of differences between corresponding components of said measured gravity matrix and said reference gravity gradient matrix, said first difference means having output terminals coupled to said Kalman filter for providing signals representative of long term position errors and signals for correcting gradiometer bias and drift, an integrator coupled to receive signals representative of vehicle velocity from said velocity means and signals representative of gravity gradient from said gradiometer means for providing signals representative of an integration over a selected time interval of a product of said gravity gradient and said vehicle velocity, thereby providing output signals representative of a gravity vector having a gravity north component, a gravity east component, and a gravity down component;

second differencing means coupled to said gravity means for receiving signals representative of measured gravity down component and to said integrator for receiving signals representative of gravity down component for providing signals representative of differences between said gravity down component and said measured gravity down component;

vertical position means coupled to receive said signals representative of said differences between said gravity down component and said measured gravity down component for providing vertical position signals representative of vertical positions of said vehicle;

sensor means for providing signals representative of vehicle vertical positions;

geoidal height map means for providing signals representative of terrain heights;

third differencing means coupled to receive said vehicle vertical position representative signals and said terrain height representative signals for providing vertical difference signals representative of differences of said vehicle vertical positions and said terrain heights;

fourth differencing means coupled to receive said vertical position representative signals and said vertical difference representative signals for providing difference signals representative of differences between said vertical position representative signals and said vertical difference representative signals to said Kalman filter from which an east velocity correction component in said state vector is determined.

* * * * *